US008929853B2

(12) United States Patent
Butler (10) Patent No.: US 8,929,853 B2
(45) Date of Patent: Jan. 6, 2015

(54) MOBILE EMERGENCY ATTACK AND FAILSAFE DETECTION

(75) Inventor: Robert D. Butler, Middletown, DE (US)

(73) Assignee: Apple Inc., Cupertino, CA (US)

( * ) Notice: Subject to any disclaimer, the term of this patent is extended or adjusted under 35 U.S.C. 154(b) by 36 days.

(21) Appl. No.: 13/604,623

(22) Filed: Sep. 5, 2012

(65) Prior Publication Data

US 2014/0066000 A1    Mar. 6, 2014

(51) Int. Cl.
*H04M 11/04*    (2006.01)
*H04M 3/42*    (2006.01)
*H04W 24/00*    (2009.01)

(52) U.S. Cl.
USPC .................. 455/404.2; 455/414.2; 455/456.3; 379/39

(58) Field of Classification Search
CPC ......... H04W 4/02; H04W 4/025; H04W 4/22; H04W 76/007; H04M 1/72536; H04M 1/72538; H04M 11/04; H04M 2242/04; H04M 2242/14; H04M 2250/10; G08B 21/0216; G08B 21/025; G08B 21/0415; G08B 21/043; G08B 21/0438; G08B 25/00; G08B 25/001; G08B 25/005; G08B 25/006; G08B 25/008; G08B 25/009; G08B 25/016
USPC ............. 455/404.1–404.2, 412.2, 456.1–457, 455/466; 379/37–51; 340/425.5, 463, 468, 340/474, 500, 527, 529, 531, 340/539.11–539.13, 540, 6.1, 7.5–8.1, 340/313–314
See application file for complete search history.

(56) References Cited

U.S. PATENT DOCUMENTS

| 5,877,683 A | 3/1999 | Sheasley |
| 2008/0227430 A1* | 9/2008 | Polk .......................... 455/404.2 |
| 2010/0330967 A1* | 12/2010 | Chiu et al. ................. 455/412.2 |
| 2011/0003577 A1* | 1/2011 | Rogalski et al. ........... 455/404.1 |
| 2011/0059720 A1* | 3/2011 | Penix et al. ................ 455/404.2 |

(Continued)

FOREIGN PATENT DOCUMENTS

| DE | 102005030921 A1 | 1/2007 |
| WO | 02061705 A1 | 8/2002 |

(Continued)

OTHER PUBLICATIONS

Partial Search Report for International PCT Application No. PCT/US2013/045518, mailed Sep. 23, 2013, 6 pages.

(Continued)

*Primary Examiner* — Michael Mapa
(74) *Attorney, Agent, or Firm* — Kilpatrick Townsend & Stockton LLP (57) ABSTRACT

A mobile communication device can be placed into an "attack detection mode." While the device is in attack detection mode, certain events can cause the device to summon assistance automatically. For example, while the device is in attack detection mode, if the device's user ceases to interact with the device, then the device can automatically place a telephone call to emergency services (e.g., by calling 911). For another example, while the device is in attack detection mode, if an accelerometer contained within the device detects a sudden shock, then the device similarly can automatically place a telephone call to emergency services. After detecting a probable emergency situation, the mobile device can responsively and continuously emit a loud audible alarm through the device's speakers at maximum volume regardless of the device's current silence or volume settings, in an effort to attract help from other people who may be nearby.

17 Claims, 7 Drawing Sheets

(56) References Cited

U.S. PATENT DOCUMENTS

| | | | |
|---|---|---|---|
| 2011/0092227 A1* | 4/2011 | Phukan | 455/456.3 |
| 2012/0092147 A1 | 4/2012 | Yu et al. | |
| 2012/0100824 A1* | 4/2012 | Michael | 455/404.2 |
| 2012/0105203 A1* | 5/2012 | Elliot et al. | 340/8.1 |
| 2012/0164968 A1* | 6/2012 | Velusamy et al. | 455/404.2 |
| 2012/0282877 A1* | 11/2012 | Amis | 455/404.1 |
| 2013/0093587 A1* | 4/2013 | Gonsalves et al. | 340/539.11 |
| 2013/0102326 A1* | 4/2013 | Chun | 455/456.1 |
| 2013/0139106 A1* | 5/2013 | Song et al. | 715/810 |
| 2013/0147628 A1* | 6/2013 | Heidvall et al. | 340/687 |
| 2013/0231077 A1* | 9/2013 | Cahill, Peter | 455/404.2 |

FOREIGN PATENT DOCUMENTS

| | | |
|---|---|---|
| WO | 2004047039 A1 | 6/2004 |
| WO | 2009109642 A1 | 9/2009 |
| WO | 2010044013 A1 | 4/2010 |

OTHER PUBLICATIONS

International Search Report and Written Opinion for International PCT Application No. PCT/US2013/045518, mailed on Dec. 3, 2013, 15 pages.

* cited by examiner

MOBILE EMERGENCY ATTACK AND FAILSAFE DETECTION

BACKGROUND

The present disclosure relates generally to mobile devices, and in particular to techniques for using mobile devices to detect probable emergency situations automatically and to help in automatically requesting aid for those potentially involved in emergency situations.

Computers and other electronic devices can communicate with each other over networks such as local area networks, wide area networks, and the Internet. Mobile devices such as cell phones, including so-called smart phones, can communicate with each other wirelessly over a variety of wireless networks including 3G and 4G networks.

While a user of a mobile device is traveling from one location to another, either by walking or by driving, that user may encounter problems. If the user is driving, then the user may become involved in an automotive accident. If the user is walking, especially in a dangerous area at night, then the user may be accosted by ill-intentioned people. If the user has medical issues, then the user may become debilitated suddenly.

Under these unfortunate circumstances, having a mobile communication device can be potentially lifesaving for the user, if the user is capable of using his device under the circumstances. If the user is capable of using his mobile device to make a telephone call for help—either to emergency services (e.g., 911) or to a trusted friend or relative—then the user has hope that aid will soon be forthcoming. Unfortunately, if the user is currently being attacked, or if the user has become incapacitated due to a sudden health affliction (e.g., heart attack) or injury (e.g., automotive collision), then the user might be unable to make a telephone call.

SUMMARY

Certain embodiments of the present invention can place a mobile communication device, such as a smart phone, into an "attack detection mode." While the device is in attack detection mode, certain events can cause the device to summon assistance automatically, even without further interaction from the device's user. For example, while the device is in attack detection mode, if the device's user ceases to interact with the device in a specified manner for at least a specified period of time, then the device can automatically place a telephone call to emergency services (e.g., by calling 911). For another example, while the device is in attack detection mode, if an accelerometer contained within the device detects a sudden shock—due, perhaps, to the device being dropped on the ground—then the device similarly can automatically place a telephone call to emergency services. In certain embodiments of the invention, the mobile device can, after detecting a probable emergency situation using the techniques mentioned above, responsively and continuously emit a loud audible alarm through the device's speakers at maximum volume regardless of the device's current silence or volume settings, in an effort to attract help from other people who may be nearby.

Certain embodiments of the invention can enable a mobile communication device, such as a smart phone, to detect a probable automotive accident by using a global positioning system (GPS) and/or an accelerometer contained within that device. For example, in response to determining that the device had previously been moving at a particular speed beyond a specified threshold (e.g., 35 miles per hour), and then had suddenly stopped moving with a deceleration exceeding a specified threshold—such as would be unusual if a car's driver were merely coming to a stop at a sign or signal—then the device can estimate that the device's user has been involved in an automotive collision. As in certain other embodiments of the invention, in response to determining a probable emergency situation such as an automotive collision, the device can automatically make a telephone call to emergency services and/or emit an alarm in an attempt to attract any nearby people who might be capable of rendering aid. In certain embodiments of the invention, in addition to or instead of utilizing sensors built-in to the mobile device in order to detect a probable emergency situation, the device utilizes sensors that are external to, but accessible by, the mobile device to detect such situations. For example, the mobile device can use a GPS and/or accelerometer and/or crash-detection systems (such as sensors associated with a vehicles' airbag deployment system, etc.) of an automotive vehicle to which the device is communicatively coupled in order to detect such situations.

The following detailed description together with the accompanying drawings will provide a better understanding of the nature and advantages of the present invention.

BRIEF DESCRIPTION

DETAILED DESCRIPTION

Figure 1:
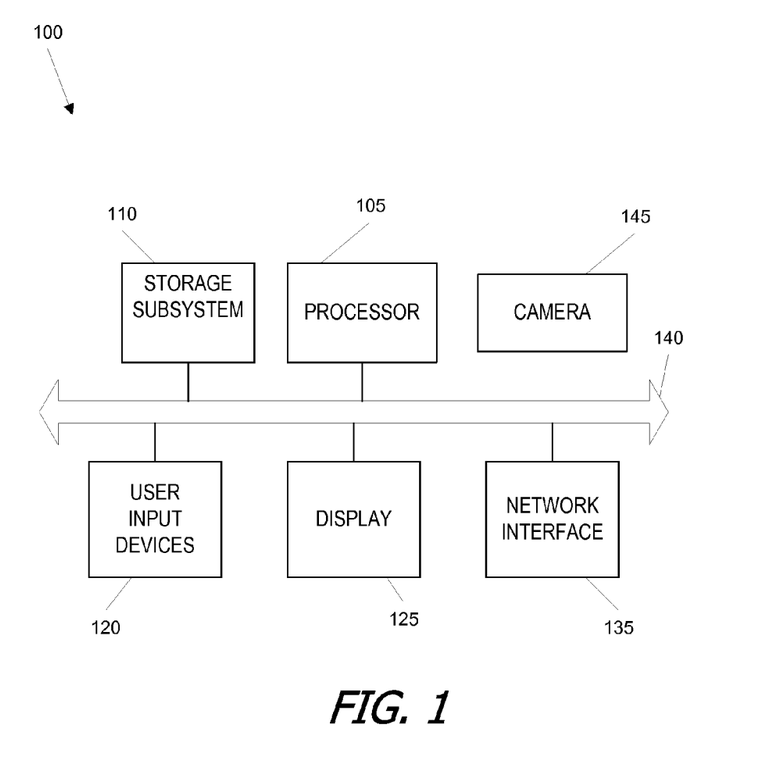
FIG. 1 is a block diagram of a computer system according to an embodiment of the present invention.

FIG. 1 illustrates a computing system 100 according to an embodiment of the present invention. Computing system 100 can be implemented as any of various computing devices, including, e.g., a desktop or laptop computer, tablet computer, smart phone, personal data assistant (PDA), or any other type of computing device, not limited to any particular form factor. Computing system 100 can include processing unit(s) 105, storage subsystem 110, input devices 120, display 125, network interface 135, a camera 145, and bus 140. Computing system 100 can be an iPhone or an iPad.

Processing unit(s) 105 can include a single processor, which can have one or more cores, or multiple processors. In some embodiments, processing unit(s) 105 can include a general-purpose primary processor as well as one or more special-purpose co-processors such as graphics processors, digital signal processors, or the like. In some embodiments, some or all processing units 105 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 105 can execute instructions stored in storage subsystem 110.

Storage subsystem 110 can include various memory units such as a system memory, a read-only memory (ROM), and a permanent storage device. The ROM can store static data and instructions that are needed by processing unit(s) 105 and other modules of computing system 100. The permanent storage device can be a read-and-write memory device. This permanent storage device can be a non-volatile memory unit that stores instructions and data even when computing system 100 is powered down. Some embodiments of the invention can use a mass-storage device (such as a magnetic or optical disk or flash memory) as a permanent storage device. Other embodiments can use a removable storage device (e.g., a floppy disk, a flash drive) as a permanent storage device. The system memory can be a read-and-write memory device or a volatile read-and-write memory, such as dynamic random access memory. The system memory can store some or all of the instructions and data that the processor needs at runtime.

Storage subsystem 110 can include any combination of computer readable storage media including semiconductor memory chips of various types (DRAM, SRAM, SDRAM, flash memory, programmable read-only memory) and so on. Magnetic and/or optical disks can also be used. In some embodiments, storage subsystem 110 can include removable storage media that can be readable and/or writeable; examples of such media include compact disc (CD), read-only digital versatile disc (e.g., DVD-ROM, dual-layer DVD-ROM), read-only and recordable Blu-Ray® disks, ultra density optical disks, flash memory cards (e.g., SD cards, mini-SD cards, micro-SD cards, etc.), magnetic "floppy" disks, and so on. The computer readable storage media do not include carrier waves and transitory electronic signals passing wirelessly or over wired connections.

In some embodiments, storage subsystem 110 can store one or more software programs to be executed by processing unit(s) 105. "Software" refers generally to sequences of instructions that, when executed by processing unit(s) 105 cause computing system 100 to perform various operations, thus defining one or more specific machine implementations that execute and perform the operations of the software programs. The instructions can be stored as firmware residing in read-only memory and/or applications stored in magnetic storage that can be read into memory for processing by a processor. Software can be implemented as a single program or a collection of separate programs or program modules that interact as desired. Programs and/or data can be stored in non-volatile storage and copied in whole or in part to volatile working memory during program execution. From storage subsystem 110, processing unit(s) 105 can retrieves program instructions to execute and data to process in order to execute various operations described herein.

A user interface can be provided by one or more user input devices 120, display device 125, and/or and one or more other user output devices (not shown). Input devices 120 can include any device via which a user can provide signals to computing system 100; computing system 100 can interpret the signals as indicative of particular user requests or information. In various embodiments, input devices 120 can include any or all of a keyboard, touch pad, touch screen, mouse or other pointing device, scroll wheel, click wheel, dial, button, switch, keypad, microphone, and so on.

Display 125 can display images generated by computing system 100 and can include various image generation technologies, e.g., a cathode ray tube (CRT), liquid crystal display (LCD), light-emitting diode (LED) including organic light-emitting diodes (OLED), projection system, or the like, together with supporting electronics (e.g., digital-to-analog or analog-to-digital converters, signal processors, or the like). Some embodiments can include a device such as a touchscreen that function as both input and output device. In some embodiments, other user output devices can be provided in addition to or instead of display 125. Examples include indicator lights, speakers, tactile "display" devices, printers, and so on.

In some embodiments, the user interface can provide a graphical user interface, in which visible image elements in certain areas of display 125 are defined as active elements or control elements that the user can select using user input devices 120. For example, the user can manipulate a user input device to position an on-screen cursor or pointer over the control element, then click a button to indicate the selection. Alternatively, the user can touch the control element (e.g., with a finger or stylus) on a touchscreen device. In some embodiments, the user can speak one or more words associated with the control element (the word can be, e.g., a label on the element or a function associated with the element). In some embodiments, user gestures on a touch-sensitive device can be recognized and interpreted as input commands; these gestures can be but need not be associated with any particular array in display 125. Other user interfaces can also be implemented.

Network interface 135 can provide voice and/or data communication capability for computing system 100. In some embodiments, network interface 135 can include radio frequency (RF) transceiver components for accessing wireless voice and/or data networks (e.g., using cellular telephone technology, advanced data network technology such as 3G, 4G or EDGE, WiFi (IEEE 802.11 family standards, or other mobile communication technologies, or any combination thereof), GPS receiver components, and/or other components. In some embodiments, network interface 135 can provide wired network connectivity (e.g., Ethernet) in addition to or instead of a wireless interface. Network interface 135 can be implemented using a combination of hardware (e.g., antennas, modulators/demodulators, encoders/decoders, and other analog and/or digital signal processing circuits) and software components.

Bus 140 can include various system, peripheral, and chipset buses that communicatively connect the numerous internal devices of computing system 100. For example, bus 140 can communicatively couple processing unit(s) 105 with storage subsystem 110. Bus 140 also connects to input devices 120 and display 125. Bus 140 also couples computing system 100 to a network through network interface 135. In this manner, computing system 100 can be a part of a network of multiple computer systems (e.g., a local area network (LAN), a wide area network (WAN), an Intranet, or a network of networks, such as the Internet. Any or all components of computing system 100 can be used in conjunction with the invention.

A camera 145 also can be coupled to bus 140. Camera 145 can be mounted on a side of computing system 100 that is on the opposite side of the mobile device as display 125. Camera 145 can be mounted on the "back" of such computing system 100. Thus, camera 145 can face in the opposite direction from display 125. Camera 145 can continuously capture video images of the scene that currently is visible behind computing system 100, from the perspective of the user that is looking at display 125.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter.

Through suitable programming, processing unit(s) 105 can provide various functionality for computing system 100. For example, processing unit(s) 105 can execute an emergency detection application. In some embodiments, the emergency detection application is a software-based process that can detect probable emergency scenarios and automatically perform remedial operations, such as placing telephone calls automatically, in response.

It will be appreciated that computing system 100 is illustrative and that variations and modifications are possible. Computing system 100 can have other capabilities not specifically described here (e.g., mobile phone, global positioning system (GPS), power management, one or more cameras, various connection ports for connecting external devices or accessories, etc.). Further, while computing system 100 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Initial Setup and Crowd-Sourced Emergency Contact Number Database Population

Figure 2:
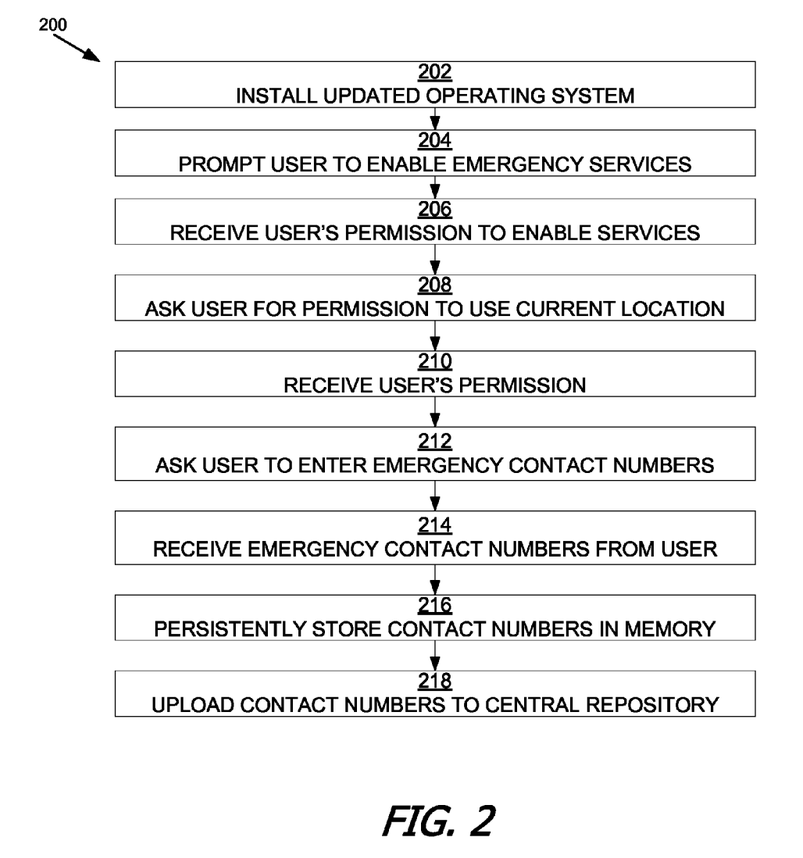
FIG. 2 is a flow diagram illustrating an example of a technique for initializing a mobile device to enable the device to respond to potential emergency situations, according to an embodiment of the invention.

FIG. 2 is a flow diagram illustrating an example of a technique 200 for initializing a mobile device to enable the device to respond to potential emergency situations, according to an embodiment of the invention. In block 202, an updated operating system can be installed on the mobile device. In block 204, in response to the installation of the updated operating system, the mobile device can prompt the mobile device's user to enable mobile emergency services. In block 206, the mobile device can receive the user's permission to enable mobile emergency services. In block 208, in response to receiving the user's permission, the mobile device can ask the device's user for permission to use the mobile device's current location presently and in the future for emergency situation detection purposes. In block 210, the mobile device can receive the user's permission to use the mobile device's current location. In block 212, the mobile device can ask the user to enter one or more emergency contact numbers. In block 214, the mobile device can receive one or more emergency contact numbers from the user. These numbers can include, for example, telephone numbers for the fire station, the police station, an ambulance service, and/or friends or family members that could be contacted in the event of an emergency. Additionally or alternatively, the mobile device can receive other forms of contact information, such as e-mail addresses, instant messaging identities, etc. In block 216, in response to receiving the one or more emergency contact numbers from the user, the mobile device can persistently store the emergency contact numbers in the mobile device's local memory.

In block 218, the mobile device can upload (e.g., via a wireless communication network) the emergency contact numbers to a central repository. The central repository can be a server farm maintained by the producer of the mobile device, for example. In one embodiment of the invention, the central repository becomes a crowd-sourced geographic database of emergency contact numbers; emergency contact numbers received from various mobile devices in various geographic locations can be stored in the central repository in association with those geographic locations. As a result, certain embodiments of the invention can make telephone calls to emergency contact numbers that are not stored in a particular mobile device's local memory, if needed, if the central repository has stored emergency contact numbers in association with that particular mobile device's current geographic location. This embodiment can be especially useful in situations in which a particular mobile device is currently located in a geographic location other than the geographic location to which the particular mobile device's locally stored emergency contact numbers pertain.

In one embodiment, whenever a user of a mobile device enters a public emergency service contact number as discussed above, that user's mobile device can automatically upload its current geographic location and the emergency service contact number to the central repository. The central repository can then use the geographic location to build a crowd-sourced database of emergency contact numbers for all geographic regions. Most mobile device users will enter such numbers while located in the geographic region in which those numbers are valid. Based on millions of such numbers being entered and being uploaded along with geographic information, a database that maps emergency contact numbers to geographic locations can be constructed within the central repository. In one embodiment, outlying contacts can be eliminated from the database, so that the majority of matching numbers within a geographic region become the numbers to use for mobile devices located in that geographic region. As a consequence of the construction of this database, when a mobile device user exits a particular geographic region, that user is not required to enter new emergency contact numbers manually; the database already contains the emergency contact numbers for the new geographic region that the user has entered. In case that a mobile device user is currently located in a geographic region for which the central repository's database contains no emergency contact numbers, the mobile device can fall back on using the emergency contact numbers that the mobile device received from the user manually in block 214. In one embodiment, the operator of the central repository can also use information from sources other than mobile device users in order to augment the geographically mapped emergency contact information stored within the central repository's database.

Automatic Emergency Contact Number Update

Figure 3:
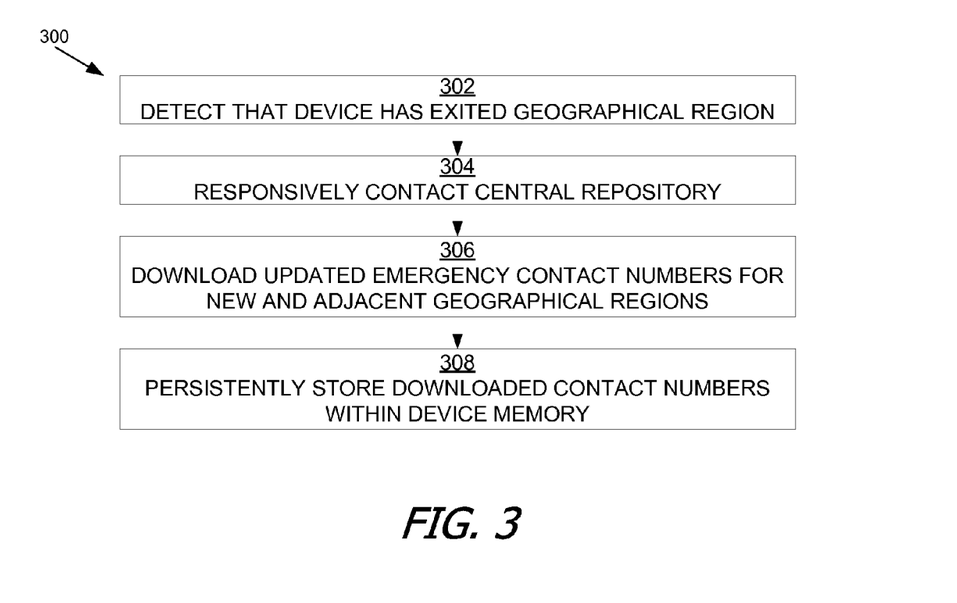
FIG. 3 is a flow diagram illustrating an example of a technique for automatically updating emergency contact numbers for a mobile device, according to an embodiment of the invention.

FIG. 3 is a flow diagram illustrating an example of a technique 300 for automatically updating emergency contact numbers for a mobile device, according to an embodiment of the invention. In block 302, using a geographic boundary detection mechanism, a mobile device can detect that it has exited from a particular geographic region. In block 304, in response to detecting that it has exited from the particular geographic region, the mobile device can automatically contact a central repository in which emergency contact numbers obtained from various different mobile devices are stored. The central repository can be a server farm maintained by the producer of the mobile device, for example. In block 306, the mobile device can download, from the central repository, updated emergency contact numbers for (a) the geographic region in which the device is currently located and (b) geographic regions adjacent to or nearby the geographic region in which the device is currently located. By downloading emergency contact numbers for the mobile device's current geographic area from the central repository automatically in response to the mobile device entering a new geographic area, the mobile device avoids the need to contact the central repository at the time of detecting a possible emergency situation; the central repository might not be accessible at such a time, potentially due to the mobile device being located in a remote area at that time. In block 308, the mobile device can persistently store the downloaded updated emergency contact numbers within the device's local memory. By persistently storing the updated emergency contact numbers for the device's current geographical area in the device's own local memory, the device can avoid having to utilize the device's data communication services during a possible emergency situation for data communications other than location services (e.g., via the device's GPS). As is discussed above with reference to FIG. 2, the central repository's database of emergency contact numbers for different geographical locations can be built using crowd-sourcing during the performance of the initial setup phases for various different mobile devices.

Automatic Accident Detection and Response

Figure 4:
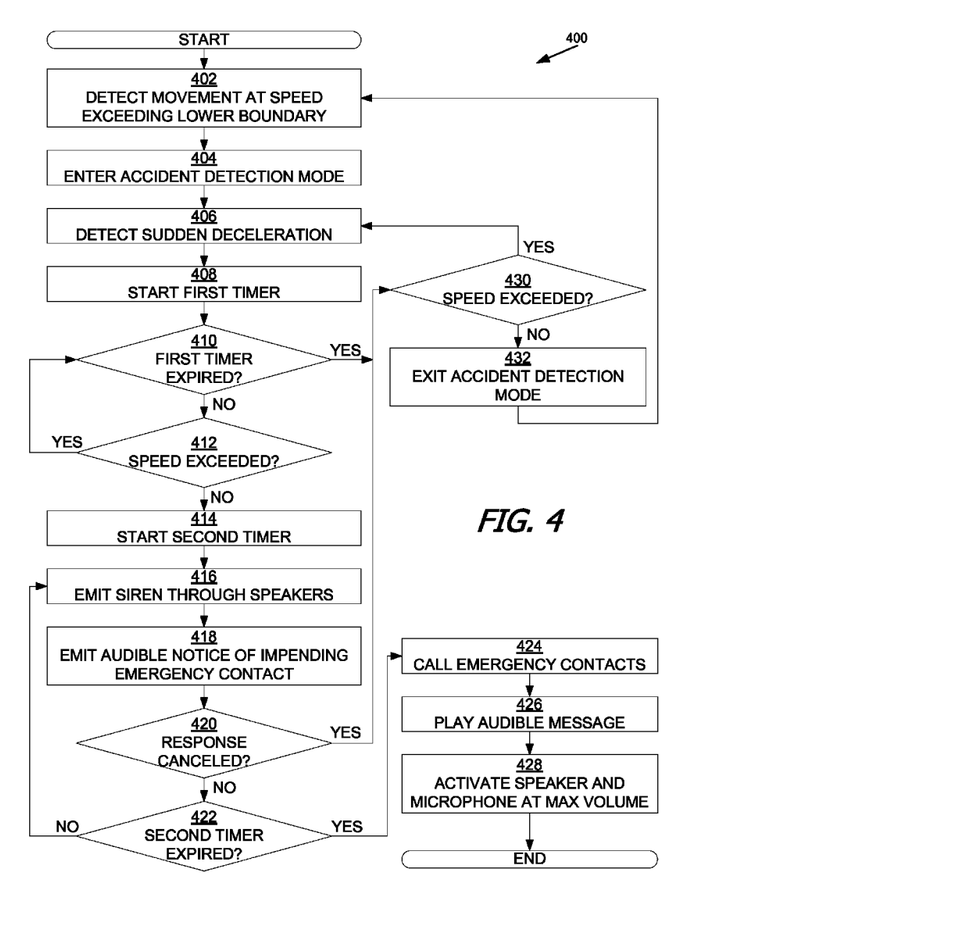
FIG. 4 is a flow diagram illustrating an example of a technique for automatically detecting and responding to an automotive accident, according to an embodiment of the invention.

FIG. 4 is a flow diagram illustrating an example of a technique 400 for automatically detecting and responding to an automotive accident, according to an embodiment of the invention. In block 402, a mobile device can detect that it is moving at a speed that exceeds a specified lower boundary speed. For example, using a GPS and/or an accelerometer of the device (or the vehicle in which the device's user is traveling), the device can detect that the device has started to move at a speed that exceeds a lower boundary speed of 20 miles per hour. In block 404, in response to detecting that it is moving at the speed that exceeds the specified lower boundary speed, the mobile device can automatically enter into accident detection mode.

In block 406, the mobile device can detect a sudden deceleration or shock. In block 408, in response to detecting the sudden deceleration or shock, the mobile device can start a first timer (e.g., for a specified quantity of seconds). In block 410, the mobile device can determine whether the first timer started in block 408 has expired. If the first timer has expired, then control passes back to block 430; the expiration of the first timer is indicative that an automotive accident has not occurred, thereby avoiding false alarms that might result from the mobile device being dropped while the device's user is traveling in a vehicle at normal speeds. Otherwise, if the first timer has not expired, then control passes to block 412.

In block 412, the mobile device can determine whether the speed at which the mobile device is traveling exceeds a specified speed limit. If the speed at which the mobile device is traveling exceeds the specified speed limit, then control passes back to block 410; under this circumstance, it is possible that the device's user has not actually been involved in an automotive accident, because the device is still moving. Otherwise, if the speed at which the mobile device is traveling does not exceed the specified speed limit, then control passes to block 414; under such circumstances, it is probable that the device's user has been involved in an automotive accident.

In block 414, the mobile device can start a second timer (e.g., 10 to 30 seconds). In block 416, the mobile device can emit, through the mobile device's speakers and/or through the speakers of the vehicle in which the mobile device's user is riding, a sound, such as a siren or other alarm, at maximum volume, in an effort to attract help from other people nearby. In an embodiment of the invention, the sound can be emitted at maximum volume regardless of the mobile device's current silence settings or volume settings. In block 418, the mobile device can emit, through the mobile device's speakers and/or through the speakers of the vehicle in which the mobile device's user is riding, a pre-recorded spoken voice notifying the vehicle's occupants that an accident has been detected and that emergency response services are going to be called automatically soon. In one embodiment of the invention, the pre-recording is selected from a plurality of pre-recordings in different languages (e.g., English, Spanish, German, French, etc.) based on a preferred language setting stored in the mobile phone's preferences. In block 420, the mobile device can determine whether the mobile device's user has canceled an automated accident response (e.g., by activating a user interface control on the mobile device's display). If the mobile device's user has canceled the automated accident response, then control passes to block 430. Otherwise, control passes to block 422.

In block 422, the mobile device can determine whether the second timer started in block 414 has expired. If the second timer has expired, then control passes to block 424. Otherwise, control passes back to block 416. In block 424, the mobile device can automatically place one or more telephone calls to emergency services numbers stored in the mobile device's local memory. In one embodiment, the updated emergency contact numbers downloaded from the central repository can be called first, and if the phones at these numbers do not respond, then the emergency contact numbers originally entered by the user at initialization can be called afterward. In one embodiment, non-emergency service contact numbers (e.g., telephone numbers for friends or family members) can be called only after other emergency contact numbers have been called and/or only after calls to those other emergency contact numbers have gone unanswered.

In block 426, the mobile device can play an audible message to one or more telephones that have answered the call(s) made in block 424. For example, the audible message can indicate, among possible other information: (a) that the message is an automated call being made from a mobile device of a person who may unconscious or unable to respond; (b) the latitude and longitude of the mobile device's current location (potentially determined using the mobile device's GPS); (c) an indication that "zero" or some other button can be pressed on the listener's telephone in order to hear other options, such as a repetition of the latitude and longitude or other pertinent information; (d) an indication that a certain button can be pressed on the listener's telephone in order to cause the mobile device to emit a distinctive siren designed to assist emergency response teams in finding the vehicle. Thus, the mobile device may interact in real time with a person who answers a call made in block 424 to provide information to that person in an automated manner. In one embodiment, the mobile device can repeat the audible message multiple times in order to help ensure that the listener has heard and understood the information being conveyed therein. The pre-recorded automated message played to emergency services can be in a language different from the language used to warn the mobile device's user that a call to emergency services is about to be made. In addition to storing emergency contact information, as discussed above, a crowd-sourced database also can use user-specified language preferences collected from multiple separate mobile devices to infer and store a preferred language for a region in which all of those devices are located. For example, most people in France will specify French as their default language when initially setting up their mobile devices for emergency contact services. Thus, a crowdsourced database can infer and store information indicating that French is the preferred language to use in France. When a U.S. English-speaking traveler visits France and has an accident, the initial automated emergency call can be made in French, based on the mappings indicated in the central repository. This allows the French emergency personnel to respond rapidly before requiring the help of a translator. The automated message can also inform emergency services that the device owner speaks English as his preferred language (based on the owner's specified language preferences). When downloading the emergency contact information from the crowdsourced database at the central repository, the mobile device can also download any language-specific recordings.

In block 428, the mobile device can activate its speakerphone and turn both its microphone and speaker volume settings to the maximum value, thereby enabling the listener and/or emergency response team members to communicate audibly with the vehicle's passengers if any of those passengers are conscious but immobilized. The conversation with the listener may be continued until the vehicle's passengers are rescued, at which point the emergency accident response system can be canceled. Accordingly, under such circumstances, the technique illustrated with reference to FIG. 4 is completed.

Alternatively, in block 430, the mobile device can determine whether it has ceased moving at a speed that exceeds the specified lower boundary speed. For example, using a GPS and/or an accelerometer of the device (or the vehicle in which the device's user is traveling), the device can detect that the device has gradually (rather than suddenly) decelerated to a speed that does not exceed a lower boundary speed of 20 miles per hour. If the device has ceased moving at a speed that exceeds the specified lower boundary speed, then control passes to block 432. Otherwise, control passes back to block 406.

In block 432, in response to detecting that it has ceased moving at a speed that exceeds the specified lower boundary speed, the mobile device can automatically exit accident detection mode. Exiting accident detection mode in this manner can avoid false alarms that might occur due to the mobile device being dropped or experiencing some other sudden shock while the mobile device's user is not traveling in the vehicle. Control passes back to block 402.

A claim can be made to the following embodiment, among potential other embodiments: 1. A method comprising: detecting that a vehicle is moving faster than a first specified speed; in response to detecting that the vehicle is moving faster than the first specified speed, placing a mobile device in a first mode; while the mobile device is in the first mode, detecting a shock to the mobile device; in response to detecting the shock to the mobile device, placing the mobile device in a second mode; while the mobile device is in the second mode, determining whether a specified amount of time has passed since the placement of the mobile device into the second mode; and in response to determining that the specified amount of time has passed since the placement of the mobile device into the second mode, automatically placing a call from the mobile device to a specified telephone number.

A claim can be made to the following embodiment, among potential other embodiments: 2. A method comprising: detecting that a vehicle is moving faster than a first specified speed; in response to detecting that the vehicle is moving faster than the first specified speed, placing a mobile device in a first mode; while the mobile device is in the first mode, detecting a shock to the mobile device; in response to detecting the shock to the mobile device, placing the mobile device in a second mode; while the mobile device is in the second mode, determining whether the vehicle is moving faster than a second specified speed; and in response to determining that the vehicle is moving faster than the second specified speed, placing the mobile device into a mode in which the mobile device was prior to the mobile device being placed into the first mode, without automatically placing a call from the mobile device to a specified telephone number.

A claim can be made to the following embodiment, among potential other embodiments: 3. A method comprising: detecting that a vehicle is moving faster than a first specified speed; in response to detecting that the vehicle is moving faster than the first specified speed, placing a mobile device in a first mode; while the mobile device is in the first mode, detecting a shock to the mobile device; in response to detecting the shock to the mobile device, placing the mobile device in a second mode; while the mobile device is in the second mode, determining whether a user of the mobile device has entered a cancellation code; and in response to determining that the user of the mobile device has entered the cancellation code, placing the mobile device into a mode in which the mobile device was prior to the mobile device being placed into the first mode, without automatically placing a call from the mobile device to a specified telephone number.

A claim can be made to the following embodiment, among potential other embodiments: 4. A method comprising: detecting that a vehicle is moving faster than a first specified speed; in response to detecting that the vehicle is moving faster than the first specified speed, placing a mobile device in a first mode; while the mobile device is in the first mode, detecting a shock to the mobile device; in response to detecting the shock to the mobile device, placing the mobile device in a second mode; while the mobile device is in the second mode, determining whether a specified amount of time has passed since the placement of the mobile device into the second mode; and in response to determining that the specified amount of time has passed since the placement of the mobile device into the second mode, sounding an alarm from the mobile device until the mobile device receives instructions to stop sounding the alarm.

A claim can be made to the following embodiment, among potential other embodiments: 5. A method comprising: detecting that a vehicle is moving faster than a first specified speed; in response to detecting that the vehicle is moving faster than the first specified speed, placing a mobile device in a first mode; while the mobile device is in the first mode, detecting a shock to the mobile device; in response to detecting the shock to the mobile device, placing the mobile device in a second mode; while the mobile device is in the second mode, determining whether a specified amount of time has passed since the placement of the mobile device into the second mode; and in response to determining that the specified amount of time has passed since the placement of the mobile device into the second mode, automatically activating a microphone and a speaker of the mobile device, thereby enabling people within the vicinity of the mobile device to communicate hands-free with emergency services personnel.

Automatic Attack Detection and Response

Figure 5A:
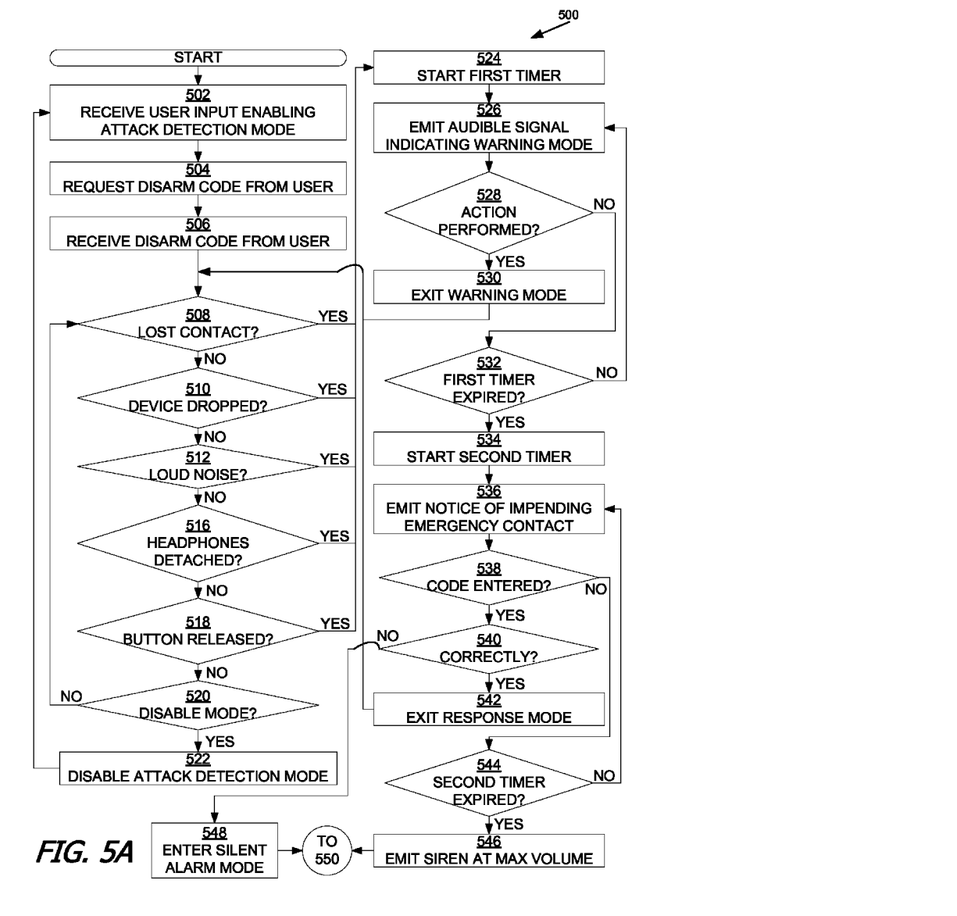
FIGS. 5A-B contain a flow diagram illustrating an example of a technique for automatically detecting and responding to an attack on a mobile device user, according to an embodiment of the invention.
Figure 5B:
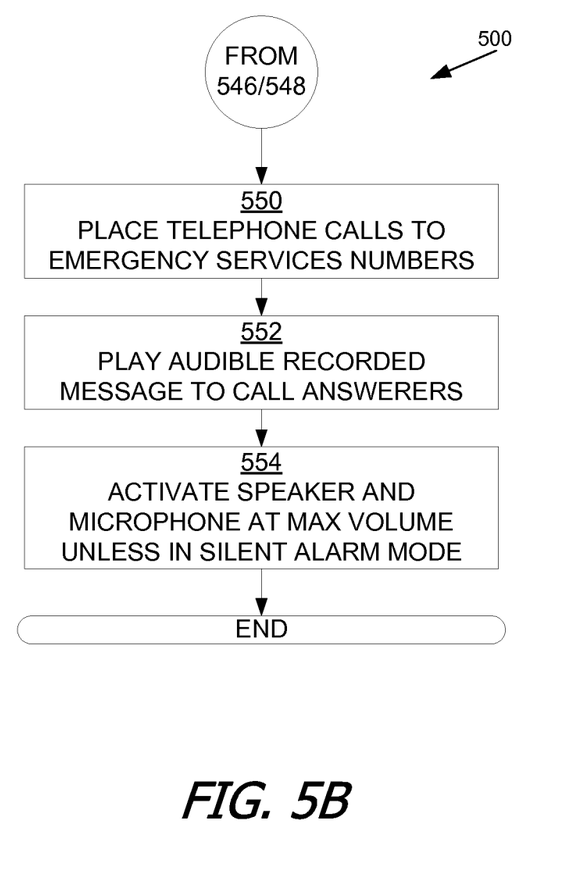

FIGS. 5A-B contain a flow diagram illustrating an example of a technique 500 for automatically detecting and responding to an attack on a mobile device user, according to an embodiment of the invention. In block 502, a mobile device can receive user input indicating that an attack detection mode is to be enabled. In block 504, in response to receiving the user input, the mobile device can request a disarm code from the user. Optionally, the mobile device can additionally ask the user to select a particular attack detection mode from a plurality of different attack detection modes. In block 506, the mobile device can receive user input indicating the disarm code and, optionally, the user's selection of the particular attack detection mode. Under circumstances in which the user selects a particular attack detection mode, fewer than all of the operations discussed below can be performed by the mobile device in detecting a potential attack on the mobile device's user; instead, just the operations associated with the particular attack detection mode can be performed. In one embodiment, multiple attack detection modes, but fewer than all of those discussed in the following blocks, can be used in conjunction with each other.

In block 508, the mobile device can determine whether the user's finger either has broken contact with the mobile device's touchscreen display or has ceased moving against the mobile device's touchscreen display for more than a specified quantity of time. If the mobile device determines that the user's finger has broken contact or ceased moving in this manner, then control passes to block 524. Otherwise, control passes to block 510.

In block 510, the mobile device can determine (e.g., using the mobile device's accelerometer) whether the mobile device has been dropped. If the mobile device determines that it has been dropped in this manner, then control passes to block 524. Otherwise, control passes to block 512.

In block 512, the mobile device can determine whether a request for help or other loud sound (e.g., a sound surpassing a specified decibel level in volume) has been received through the mobile device's microphone (e.g., a built-in microphone or a microphone integrated into attached headphones). If the mobile device determines that a request for help or other loud sound has been received in this manner, then control passes to block 524. Otherwise, control passes to block 516.

In block 516, the mobile device can determine whether headphones that were attached to mobile device's audio jack have become disconnected from that audio jack. If the mobile device determines that the headphones have become disconnected from the audio jack in this manner, then control passes to block 524. Otherwise, control passes to block 518.

In block 518, the mobile device can determine whether a specified volume control button (e.g., the "up" or "down" volume control button) which previously was depressed has been released—much like a "dead man switch." If the mobile device determines that the specified volume control button has been released in this manner, then control passes to block 524. Otherwise, control passes to block 520.

In block 520, the mobile device can determine whether it has received user input indicating that the attack detection mode is to be disabled. In one embodiment, such a determination involves determining that the user has entered the disarm code that was supplied to the mobile device in block 506. If the mobile device determines that it has received user input indicating that the attack detection mode is to be disabled, then control passes to block 522. Otherwise, control passes back to block 508.

In block 522, the mobile device can disable attack detection mode until the user indicates that attack detection mode is to be re-enabled. Control passes back to block 502.

Alternatively, in block 524, the mobile device can start a first timer for a specified quantity of time (e.g., three seconds), thereby starting "warning mode." In block 526, the mobile device can emit, through the mobile device's speakers, an audible signal warning the mobile device's user that attack detection response will be triggered after the expiration of the specified quantity of time unless the user takes some specified responsive action. In one embodiment, the audible signal can be emitted at a specified volume level (e.g., at a "medium" volume level) regardless of the mobile device's current volume settings and silent mode settings.

In one embodiment, the responsive action can depend upon the attack detection mode that caused the warning mode to be started. For example, if the warning mode was started due to the user's finger breaking contact with the device's display or ceasing to move against the device's display, then the responsive action can be the re-establishment of contact with, or movement against, the device's display. For another example, if the warning mode was started due to the headphones being disconnected from the device's audio jack, then the responsive action can be the re-insertion of headphones into the device's audio jack. For yet another example, if the warning mode was started due to the specified volume button being released, then the responsive action can be the re-depression of the specified volume button. In one embodiment, the responsive action additionally or alternatively can involve the mobile device detecting that the user has activated a specified user interface control displayed on the mobile device's display. In one embodiment, the responsive action additionally or alternatively can involve the mobile device detecting that the user has shaken the mobile device. However, in one embodiment, if the warning mode has been started as a result of a particular attack detection mode, then only a user action specifically corresponding to that mode (such as those discussed above) can serve as the responsive action.

In block 528, the mobile device can determine whether the specified responsive action discussed in block 526 has been performed. If the mobile device determines that the specified responsive action has been performed, then control passes to block 530. Otherwise, control passes to block 532.

In block 530, the mobile device can stop emitting the audible signal that the device started to emit in block 526, and can exit warning mode. Control passes back to block 508.

Alternatively, in block 532, the mobile device can determine whether the first timer started in block 524 has expired. If the mobile device determines that the first timer has expired, then control passes to block 534. Otherwise, control passes back to block 526.

In block 534, the mobile device can start a second timer for a specified quantity of time (e.g., thirty seconds), thereby starting "attack detection response mode." In block 536, the mobile device can emit, through the mobile device's speakers, an audible signal warning the mobile device's user that emergency services will be contacted after the expiration of the specified quantity of time. In one embodiment, the audible signal can be emitted at a specified volume level (e.g., at a "medium" volume level) regardless of the mobile device's current volume settings and silent mode settings. In one embodiment, the mobile device also can display a flashing warning, indicating substantially the same information as the audible signal, on the device's display. In one embodiment, the display can present a virtual keypad or keyboard and a user interface element through which the user can supply the disarm code that was supplied in block 506.

In block 538, the mobile device can determine whether a code has been entered. If a code has been entered, then control passes to block 540. Otherwise, control passes to block 544.

In block 540, the mobile device can determine whether the code entered in block 538 is the same as the disarm code supplied in block 506. If the mobile device determines that the disarm code has been entered correctly, then control passes to block 542. Otherwise, control passes to block 548. In one embodiment, only one opportunity is given to enter the correct disarm code correctly, although, in an alternative embodiment, more than one opportunity is given to enter the disarm code correctly before control passes to block 548.

In block 542, the mobile device can stop emitting the audible signal that the device started to emit in block 536, and can exit attack detection response mode. Control passes back to block 508.

Alternatively, in block 544, the mobile device can determine whether the second timer started in block 534 has expired. If the mobile device determines that the second timer has expired, then control passes to block 546. Otherwise, control passes back to block 536.

In block 546, the mobile device can emit a very loud siren through the mobile device's speakers. The siren warns attackers that law enforcement authorities are en route and encourages the attacks to depart immediately. In one embodiment, the siren can be emitted at a maximum volume level regardless of the mobile device's current volume settings and silent mode settings. Hopefully, the siren is sufficient to frighten attackers away. Control passes to block 550.

Alternatively, in block 548, the mobile device does not emit any alarm and provides no indication that the code entered does not match the disarm code supplied in block 506. Thus, the mobile device enters "silent alarm mode." The reason for the silent alarm is to prevent an attacker who might have forced the mobile device's user to enter a code (incorrectly, unbeknownst to the attack) from discovering that the user entered an incorrect code; such discovery might anger the attacker and lead the attacker to harm the user. Control passes to block 550.

In block 550, the mobile device can automatically place one or more telephone calls to emergency services numbers stored in the mobile device's local memory. In one embodiment, the updated emergency contact numbers downloaded from the central repository can be called first, and if the phones at these numbers do not respond, then the emergency contact numbers originally entered by the user at initialization can be called afterward. In one embodiment, non-emergency service contact numbers (e.g., telephone numbers for friends or family members) can be called only after other emergency contact numbers have been called and/or only after calls to those other emergency contact numbers have gone unanswered.

In block 552, the mobile device can play an audible message to one or more telephones that have answered the call(s) made in block 550. For example, the audible message can indicate, among possible other information: (a) that the message is an automated call being made from a mobile device of a person who may be under attack and unable to respond; (b) the latitude and longitude of the mobile device's current location (potentially determined using the mobile device's GPS); (c) an indication that "zero" or some other button can be pressed on the listener's telephone in order to hear other options, such as a repetition of the latitude and longitude or other pertinent information; (d) an indication that a certain button can be pressed on the listener's telephone in order to cause the mobile device to emit a distinctive siren designed to assist emergency response teams in finding the mobile device's user. Thus, the mobile device may interact in real time with a person who answers a call made in block 550 to provide information to that person in an automated manner. In one embodiment, the mobile device can repeat the audible message multiple times in order to help ensure that the listener has heard and understood the information being conveyed therein.

In block 554, unless the mobile device is in silent alarm mode, the mobile device can activate its speaker phone and turn both its microphone and speaker volume settings to the maximum value, thereby enabling the listener and/or emergency response team members to communicate audibly with the mobile device's user. The conversation with the listener may be continued until the user is rescued, at which point the emergency attack response system can be canceled. Accordingly, under such circumstances, the technique illustrated with reference to FIG. 5 is completed. In one embodiment, if the mobile device is in silent alarm mode, then the speaker is deactivated instead, so that the attacker is not made aware that the user entered an incorrect code.

Failsafe Emergency Detection

Figure 6:
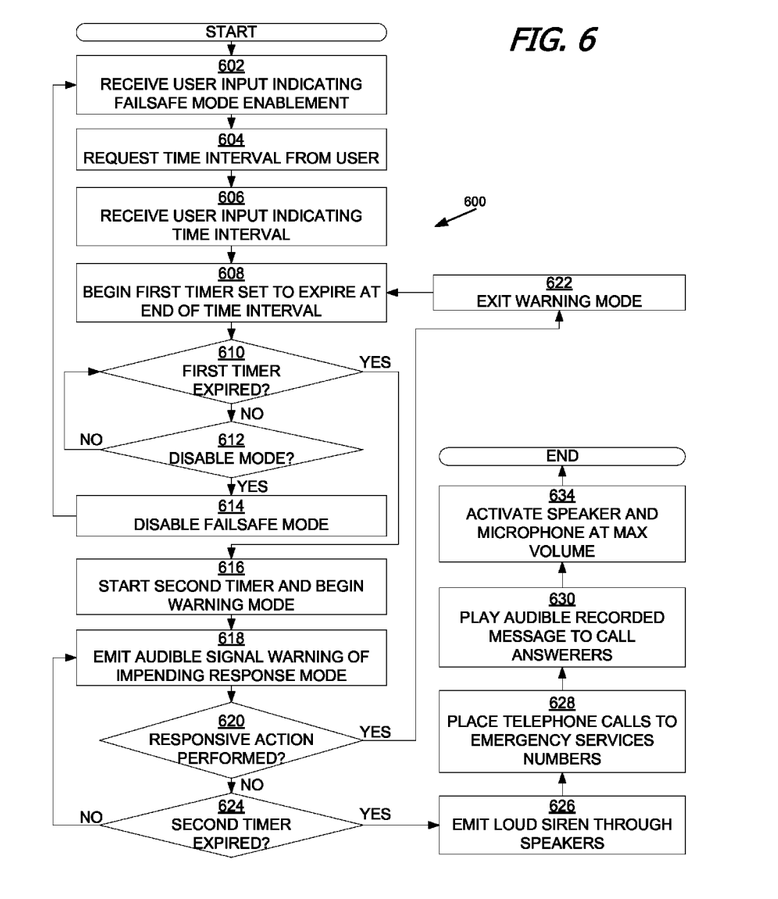
FIG. 6 is a flow diagram illustrating an example of a technique for automatically providing a failsafe way of detecting and responding to a potential emergency, according to an embodiment of the invention.

FIG. 6 is a flow diagram illustrating an example of a technique 600 for automatically providing a failsafe way of detecting and responding to a potential emergency, according to an embodiment of the invention. The technique is especially useful for helping to monitor a person suffering from a medical condition which might cause him to become incapacitated or unresponsive without notice, in which case emergency services ought to be notified immediately and automatically. In block 602, a mobile device can receive user input indicating that a failsafe mode is to be enabled. In block 604, in response to receiving the user input, the mobile device can request a time interval from the user. This is the time interval during which the mobile device user needs to interact with the mobile device in order to prevent emergency services from being notified automatically. In block 606, the mobile device can receive user input indicating the time interval (e.g., a quantity of minutes or hours or a time of day and/or a date).

In block 608, the mobile device can begin (or reset) a first timer set to expire at the end of the time interval specified in block 606, thereby entering failsafe mode. In block 610, the mobile device determines whether the first timer has expired. In one embodiment of the invention, the mobile device can extend the amount of time left on the first timer if the first timer would expire during a specified time-of-day range (e.g., hours during which the mobile device user would be expected to be asleep), so that the first timer will not expire under after the end of that time-of-day range. If the first time has not yet expired, then control passes back to block 612. Otherwise, control passes to block 616.

In block 612, the mobile device can determine whether it has received user input indicating that the failsafe mode is to be disabled. If the mobile device determines that it has received user input indicating that the failsafe mode is to be disabled, then control passes to block 614. Otherwise, control passes back to block 610.

In block 614, the mobile device can disable failsafe mode until the user indicates that failsafe mode is to be re-enabled. Control passes back to block 602.

Alternatively, in block 616, the mobile device can start a second timer for a specified quantity of time (e.g., thirty seconds), thereby starting "warning mode." In block 618, the mobile device can emit, through the mobile device's speakers, an audible signal warning the mobile device's user that failsafe detection response will be triggered after the expiration of the specified quantity of time unless the user takes some specified responsive action. In one embodiment, the audible signal can be emitted at a specified volume level (e.g., at a "medium" volume level) regardless of the mobile device's current volume settings and silent mode settings.

In one embodiment, the responsive action can involve the mobile device detecting that the user has activated a specified user interface control displayed on the mobile device's display.

In one embodiment, the responsive action additionally or alternatively can involve the mobile device detecting that the user has shaken the mobile device.

In block 620, the mobile device can determine whether the specified responsive action discussed in block 618 has been performed. If the mobile device determines that the specified responsive action has been performed, then control passes to block 622. Otherwise, control passes to block 624.

In block 622, the mobile device can stop emitting the audible signal that the device started to emit in block 618, and can exit warning mode. Control passes back to block 608.

Alternatively, in block 624, the mobile device can determine whether the second timer started in block 616 has expired. If the mobile device determines that the second timer has expired, then control passes to block 626. Otherwise, control passes back to block 618.

In block 626, the mobile device can emit a very loud siren through the mobile device's speakers. The siren attempts to notify nearby people that the mobile user is in need of aid. In one embodiment, the siren can be emitted at a maximum volume level regardless of the mobile device's current volume settings and silent mode settings.

In block 628, the mobile device can automatically place one or more telephone calls to emergency services numbers stored in the mobile device's local memory. In one embodiment, the updated emergency contact numbers downloaded from the central repository can be called first, and if the phones at these numbers do not respond, then the emergency contact numbers originally entered by the user at initialization can be called afterward. In one embodiment, non-emergency service contact numbers (e.g., telephone numbers for friends or family members) can be called only after other emergency contact numbers have been called and/or only after calls to those other emergency contact numbers have gone unanswered. In one embodiment of the invention, the mobile device can be configured to call telephone numbers of friends or family members first, and only resort to calling public emergency service telephone numbers if calls to the telephones of the friends or family members go unanswered.

In block 630, the mobile device can play an audible message to one or more telephones that have answered the call(s) made in block 628. For example, the audible message can indicate, among possible other information: (a) that the message is an automated call being made from a mobile device of a person who may be medically incapacitated and unable to respond; (b) the latitude and longitude of the mobile device's current location (potentially determined using the mobile device's GPS); (c) an indication that "zero" or some other button can be pressed on the listener's telephone in order to hear other options, such as a repetition of the latitude and longitude or other pertinent information; (d) an indication that a certain button can be pressed on the listener's telephone in order to cause the mobile device to emit a distinctive siren designed to assist emergency response teams in finding the mobile device's user. Thus, the mobile device may interact in real time with a person who answers a call made in block 628 to provide information to that person in an automated manner. In one embodiment, the mobile device can repeat the audible message multiple times in order to help ensure that the listener has heard and understood the information being conveyed therein. In one embodiment, the mobile device can be configured to play another audible message customized by the mobile device user before or in addition to the audible message discussed above. In one embodiment, if such a customized audible message is played, then the mobile device can indicate that the listener can press a specified button on his telephone in order to cause the customized audible message to be repeated.

In block 634, the mobile device can activate its speaker phone and turn both its microphone and speaker volume settings to the maximum value, thereby enabling the listener and/or emergency response team members to communicate audibly with the mobile device's user. The conversation with the listener may be continued until the user is rescued, at which point the emergency attack response system can be canceled. Accordingly, under such circumstances, the technique illustrated with reference to FIG. 6 is completed.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above can make reference to specific hardware and software components, those skilled in the art will appreciate that different combinations of hardware and/or software components can also be used and that particular operations described as being implemented in hardware might also be implemented in software or vice versa.

Computer programs incorporating various features of the present invention can be encoded and stored on various computer readable storage media; suitable media include magnetic disk or tape, optical storage media such as compact disk (CD) or DVD (digital versatile disk), flash memory, and other non-transitory media. Computer readable media encoded with the program code can be packaged with a compatible electronic device, or the program code can be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method comprising:
   a mobile device entering a particular mode of operation and starting a timer;
   while the mobile device is in the particular mode of operation, the mobile device determining whether a particular input has been received at the mobile device prior to expiration of the timer;
   in response to determining that the particular input was not received prior to the expiration of the timer, the mobile device automatically performing operations comprising:
   determining a current location of the mobile device;
   sending the current location to a repository that stores mappings between (a) particular locations of other mobile devices determined when the other mobile devices sent the particular locations to the repository and (b) telephone numbers that the other mobile devices sent to the repository when the other mobile devices sent the particular locations to the repository;
   receiving, from the repository, a particular telephone number that the repository previously mapped to the current location in response to receiving the particular telephone number from another mobile device that was also at the current location; and sending information to a specified recipient associated with the particular telephone number.

2. The method of claim 1, further comprising:

receiving, at the mobile device, user input commanding the mobile device to enter a first mode of operation;

in response to receiving the user input, the mobile device entering the first mode of operation;

while the mobile device is in the first mode of operation, the mobile device detecting continuous movement of a user's finger on a touch-sensitive screen of the mobile device;

for as long as the mobile device detects continuous movement of the user's finger on the touch-sensitive screen of the mobile device, the mobile device remaining in the first mode of operation;

while the mobile device is in the first mode of operation, the mobile device detecting a cessation of the previously detected continuous movement of the user's finger on the touch-sensitive screen of the mobile device;

in response to detecting the cessation while the mobile device in the first mode of operation, the mobile device entering the particular mode of operation and starting the timer; and in response to detecting the cessation while the mobile device in the first mode of operation, the mobile device emitting an audible signal warning a user of the mobile device that the specified recipient will be called unless the user performs a specified action.

3. The method of claim 1, wherein the particular input is a disarm code that a user of the mobile device specified.

4. The method of claim 1, wherein the particular input is a re-establishment of contact of a user's finger with a touch-sensitive screen of the mobile device.

5. The method of claim 1, wherein the particular input is a re-connection of headphones into a headphone jack of the mobile device.

6. The method of claim 1, wherein the particular input is a re-depression of a volume button of the mobile device.

7. The method of claim 1, wherein the particular input is a shaking of the mobile device.

8. The method of claim 1, further comprising:

playing a recorded audio message to an answerer of a call to the telephone number.

9. The method of claim 1, further comprising:

determining whether an incorrect disarm code was entered prior to the expiration of the timer; and in response to determining that an incorrect disarm code was entered prior to the expiration of the timer, the mobile device automatically sending information to a specified recipient without providing any indication that an incorrect disarm code was entered and without providing any indication that the information was sent.

10. The method of claim 1, further comprising:

determining whether an incorrect disarm code was entered prior to the expiration of the timer; and in response to determining that an incorrect disarm code was not entered prior to the expiration of the timer, the mobile device emitting an audible alarm that indicates that emergency services have been called.

11. The method of claim 1, wherein sending the information to the specified recipient associated with the particular telephone number comprises sending a text message containing the information to the particular telephone number.

12. The method of claim 1, wherein sending the current location to the repository comprises sending the current location to the repository in response to determining that the mobile device has exited a particular geographical location.

13. A method comprising: receiving particular user input that indicates a default telephone number to be automatically called by a mobile device in case of an emergency; using a global positioning system of the mobile device to automatically determine a geographical region in which the mobile device is located at the time of the receipt of the particular user input; and sending the default telephone number and an identity of a geographical region from the mobile device over a network to a server that stores mappings between telephone numbers and geographical regions and the method further comprising: subsequently receiving, at the mobile device, first user input commanding the mobile device to enter a first mode of operation; in response to receiving the first user input, the mobile device entering the first mode of operation; while the mobile device is in the first mode of operation, the mobile device detecting an occurrence of a particular event from a set of specified events; in response to detecting the occurrence of the particular event while the mobile device in the first mode of operation, the mobile device entering a second mode of operation and starting a timer; while the mobile device is in the second mode of operation, the mobile device determining whether a second input has been received at the mobile device prior to expiration of the timer; in response to determining that the second input was not received prior to the expiration of the timer, the mobile device automatically sending information to a specified recipient of the default telephone number for the geographical region of the mobile device.

14. A non-transitory computer-readable storage medium storing instructions which, when executed by one or more processors, cause the one or more processors to perform operations comprising:

a mobile device entering a particular mode of operation and starting a timer;

while the mobile device is in the particular mode of operation, the mobile device determining whether a particular input has been received at the mobile device prior to expiration of the timer;

in response to determining that the particular input was not received prior to the expiration of the timer, the mobile device automatically performing operations comprising:

determining a current location of the mobile device;

sending the current location to a repository that stores mappings between (a) particular locations of other mobile devices determined when the other mobile devices sent the particular locations to the repository and (b) telephone numbers that the other mobile devices sent to the repository when the other mobile devices sent the particular locations to the repository;

receiving, from the repository, a particular telephone number that the repository previously mapped to the current location in response to receiving the particular telephone number from another mobile device that was also at the current location; and sending information to a specified recipient associated with the particular telephone number.

15. The non-transitory computer-readable storage medium of claim 14, wherein sending the information to the specified recipient associated with the particular telephone number comprises sending a text message containing the information to the particular telephone number.

16. The non-transitory computer-readable storage medium of claim 14, wherein sending the current location to the repository comprises sending the current location to the repository in response to determining that the mobile device has exited a particular geographical location.

17. A non-transitory computer-readable storage medium storing instructions which, when executed by one or more processors, cause the one or more processors to perform operations comprising: receiving particular user input that indicates a default telephone number to be automatically called by a mobile device in case of an emergency; using a global positioning system of the mobile device to automatically determine a geographical region in which the mobile device is located at the time of the receipt of the particular user input; and sending the default telephone number and an identity of the geographical region from the mobile device over a network to a server that stores mappings between telephone numbers and geographical regions and the method further comprising: subsequently receiving, at the mobile device, first user input commanding the mobile device to enter a first mode of operation; in response to receiving the first user input, the mobile device entering the first mode of operation; while the mobile device is in the first mode of operation, the mobile device detecting an occurrence of a particular event from a set of specified events; in response to detecting the occurrence of the particular event while the mobile device in the first mode of operation, the mobile device entering a second mode of operation and starting a timer; while the mobile device is in the second mode of operation, the mobile device determining whether a second input has been received at the mobile device prior to expiration of the timer; in response to determining that the second input was not received prior to the expiration of the timer, the mobile device automatically sending information to a specified recipient of the default telephone number for the geographical region of the mobile device.

\* \* \* \* \*